July 30, 1963 — A. C. DUCATI — 3,099,548
METHOD OF MAKING GLASS FIBERS
Original Filed May 29, 1958 — 3 Sheets-Sheet 1

INVENTOR.
ADRIANO C. DUCATI
BY
ATTORNEY

July 30, 1963 A. C. DUCATI 3,099,548
METHOD OF MAKING GLASS FIBERS
Original Filed May 29, 1958 3 Sheets-Sheet 2
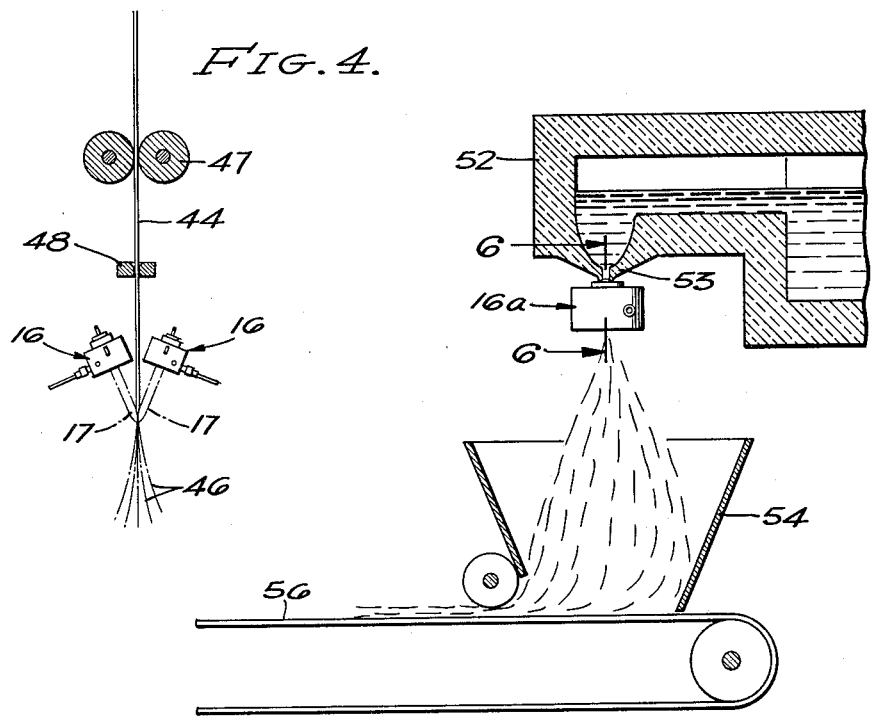
FIG. 4.
FIG. 5.
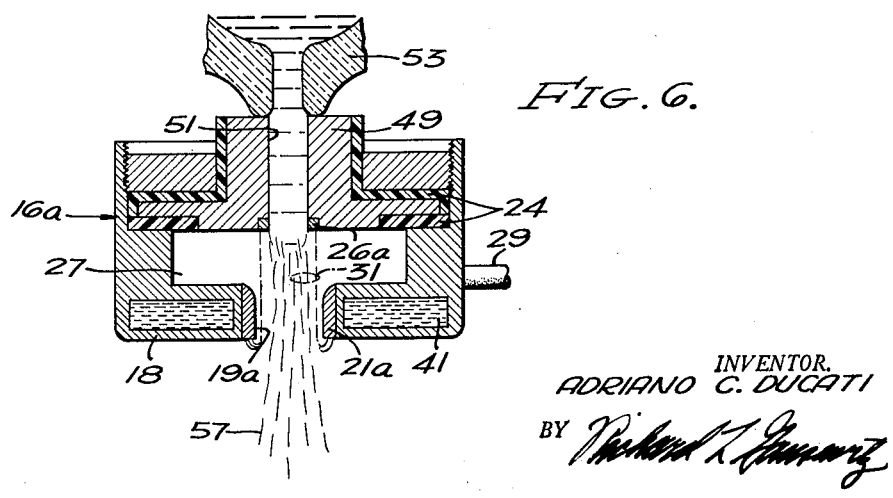
FIG. 6.
INVENTOR.
ADRIANO C. DUCATI
BY
ATTORNEY July 30, 1963  A. C. DUCATI  3,099,548
METHOD OF MAKING GLASS FIBERS
Original Filed May 29, 1958  3 Sheets-Sheet 3

INVENTOR.
ADRIANO C. DUCATI
BY
ATTORNEY

United States Patent Office 3,099,548
Patented July 30, 1963

3,099,548
METHOD OF MAKING GLASS FIBERS
Adriano C. Ducati, Newport Beach, Calif., assignor to Plasmadyne Corporation, Santa Ana, Calif., a corporation of California
Continuation of abandoned application Ser. No. 738,887, May 29, 1958. This application Dec. 29, 1961, Ser. No. 163,332
1 Claim. (Cl. 65—5)

This invention relates to a method of making vitreous fibers. More particularly, the invention relates to the blowing or drawing of fiber-forming material into fine threads or filaments by the use of electrical plasma-jet torch means. This application is a continuation of patent application Serial No. 738,887, now abandoned, filed May 29, 1958, for Method of Making Glass fibers.

The manufacture of fibers from vitreous material has previously been performed in a number of ways, including spinning on a rotating drum, and blowing or drawing by means of a blast of air, steam or heated gas. A highly important consideration in all of these methods is the maintenance of a sufficiently high temperature at the point of blowing or drawing. A further important consideration or factor relates to the making of vitreous fibers having diameters sufficiently small to increase the strength and other properties of the resulting manufactured products. One substantial difficulty previously encountered with relation to the forming of vitreous material into fine threads or filaments was that the rate of production was decreased to an uneconomical level. Thus, in order to manufacture large weights of fibers having extremely small diameters, it is necessary that the rate of drawing of the molten glass be extremely high. A highly important limitation of prior-art methods was that it was impossible or impractical to make fibers out of vitreous substances, including zirconia and a number of other refractories, having high melting points.

In view of the above factors characteristic of the manufacture of vitreous fibers, and particularly fibers having small diameters, it is an object of the present invention to provide an efficient and economical method for manufacturing small-diameter vitreous fibers at a high rate of production.

A further object is to provide a method of manufacturing extremely small-diameter fibers by performing blowing or drawing at very high temperatures and velocities.

A further object is to provide a practical method for forming fibers out of substances having high melting points.

A further object is to provide a method of manufacturing vitreous fibers from vitreous substances in various conditions, including molten, rod and powder.

These and other objects and advantages of the present invention will be more fully set forth in the following specification and claim, considered in connection with the attached drawings to which they relate.

In the drawings:

FIGURE 4 is a schematic view illustrating the use of plasma-jet torches in converting a vitreous rod into filaments or fibers;

FIGURE 5 illustrates schematically the passing of molten vitreous substance through a plasma-jet torch to result in the formation of fibers;

FIGURE 6 is an enlarged section taken on line 6—6 of FIGURE 5;

Figure 1:
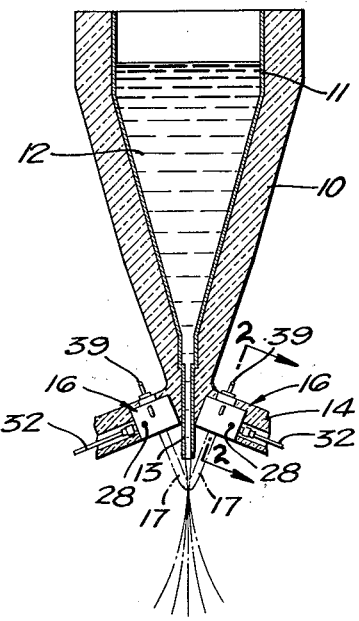
FIGURE 1 is a schematic view, partly in elevation and partly in vertical section, illustrating the use of electrical plasma-jet torches in drawing molten vitreous material out of a vat and converting the molten material into vitreous fibers.
Figure 2:
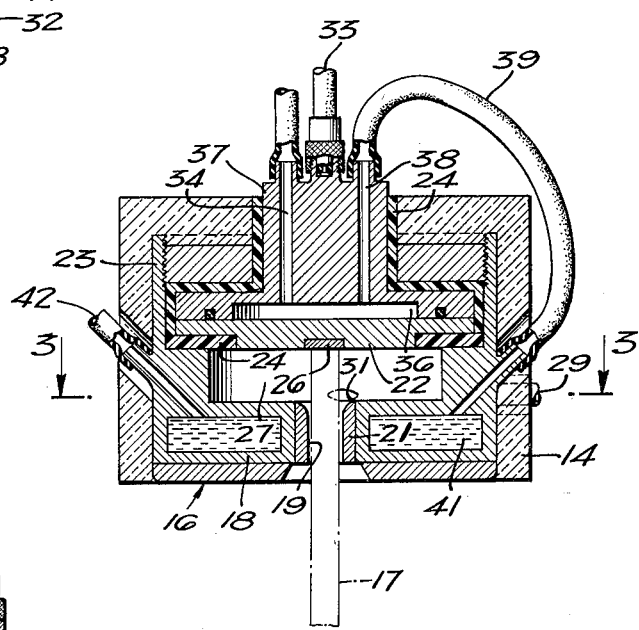
FIGURE 2 is an enlarged section taken upon line 2—2 of FIGURE 1.
Figure 3:
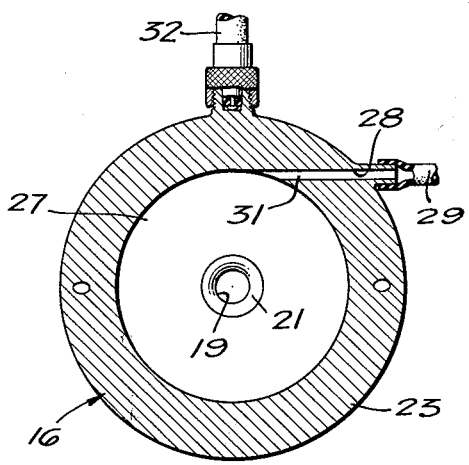
FIGURE 3 is a section on line 3—3 of FIGURE 2, illustrating the tangential passage means for introducing constricting gas into the plasma-jet torch.

Referring first to the embodiment of FIGURES 1–3, a vat or feeder 10, having a suitable liner 11, is shown as filled with molten glass or other vitreous substance 12. The vat 10 and liner 11 converge downwardly, and liner 11 is provided with a downwardly extending tubular nipple 13 the lower end of which is located a substantial distance below vat 10. Suitable auxiliary heating means, such as means to pass an electric heating current through at least the lower portion of liner 11 and nipple 13, may be provided to maintain a downward flow of molten substance 12 at suitable temperature.

The vat 10, which is formed of a suitable refractory material, is shown as having a lower flare or flange portion 14 adapted to mount one or more plasma-jet torches 16, there being two such torches illustrated in the drawings. The torches 16 are so mounted that their plasma jets 17 converge toward the stream of molten glass flowing out the lower end of nipple 13, so that a blast of hot plasma is provided in the same general direction as the flow of molten glass. The plasma serves to draw glass out of the nipple and convert the same into fine threads or filaments. The plasma jets 17 have a high temperature, for example several thousand degrees centigrade, and a very high velocity in the sonic range. This combination of high temperature and high velocity has the effect of forming fine glass filaments or fibers at a high rate of production.

Referring particularly to FIGURES 2 and 3, each plasma-jet torch 16 is illustrated to comprise a generally disc-shaped nozzle electrode 18 having a nozzle opening 19 at its axis or center, the nozzle opening being protected by a refractory sleeve or insert 21 which may be formed of a metal such as tungsten. A disc-shaped back electrode 22 is provided in spaced coaxial relationship relative to nozzle electrode 18, being electrically separated from a skirt portion 23 of the nozzle electrode by means of suitable insulators 24. The central or arcing portion of the back electrode is also protected by a suitable electrically-conductive refractory substance, such as the tungsten insert shown at 26.

An annular arc chamber 27 is formed between nozzle electrode 18 and back electrode 22, and coaxially therewith, for the purpose of receiving constricting gas introduced through a tangential passage shown at 28 in FIGURE 3. Constricting gas is introduced into passage 28 from a suitable hose 29 leading to a gas pressure source, not shown, and enters the chamber 27 through an inlet 31. The pressure and velocity of the constricting gas are such that the gas whirls in the arc chamber 27 to form a vortex between the back electrode insert 26 and the nozzle opening 19. Because of the electrical insulating characteristics of the whirling gas, an electric arc struck between the refractory metal 26 and 21 is constricted to the vortex, so that the temperature of the arc is greatly elevated. The electrical plasma jet 17 is thus generated and flows at high velocity out the nozzle opening 19 as shown in the drawings.

Electric current is conducted to the nozzle 18 through a lead 32 (FIGURES 1 and 3), and to the back electrode 22 through a lead 33 (FIGURE 2). Leads 32 and 33 are connected to a suitable source, not shown, of electric current. The source should be a D.C. source and be capable of delivering hundreds of amperes. The voltage need not be great, however, for example 100 volts. In order to increase the life of the electrodes, the constricting gas introduced through hose 29 and passage 28 should be an inert gas such as argon, for example.

The absolute pressure of the gas entering through tangential inlet 31 should be at least 1.6 times the absolute ambient pressure. The spacing between back electrode 22 and nozzle electrode 18, that is to say the distance between the adjacent surfaces of inserts 21 and 26, should be about 1 to 2 times the diameter of nozzle opening 19, and should not be more than 4 times such diameter. The diameter or arc chamber 27 should be at least 2 times the diameter of nozzle opening 19, and the cross-sectional area of inlet 31 should be less than the cross-sectional area of nozzle opening 19. These and other factors relative to the plasma-jet torch 16 are set forth in detail in patent application Serial Number 697,279, now abandoned, filed November 18, 1957, for Plasma Stream Apparatus and Methods, inventors Gabriel M. Giannini and Adriano C. Ducati. Said application constitutes a continuation-in-part of application Serial Number 649,461, now abandoned, filed March 29, 1957, by the same inventors for Plasma Stream Apparatus and Methods.

The electrodes 18 and 22 are suitably cooled, for example by means of a series-connected water cooling circuit comprising an inlet passage 34 through which water flows to a chamber 36 provided behind back electrode 22 in a body or stem element 37. The water then flows out a passage 38 to a hose 39 and thus to an annular chamber 41 formed around insert 21 in nozzle electrode 18. From chamber 41, the water flows out a hose 42 leading to a suitable drain. This construction is similar to the one described in the above-cited patent applications, particularly with reference to FIGURE 3 thereof.

To summarize the method of FIGURES 1-3, gas is introduced through passage 28 (FIGURE 3) and whirls in arc chamber 27 around an electric arc struck between inserts 26 and 21. The arc is thus constricted by the gas to the vortex therein, and a certain proportion of the gas enters the arc to provide electrical plasma which streams through the nozzle opening 19 at high temperature and velocity. The jet of plasma from one or more torches 16 is directed at an angle toward the lower end portion of nipple 13, as shown in FIGURE 1, producing the effect of drawing molten glass from the vat 10 and converting the glass into filaments or fibers. Such filaments or fibers may be collected in a suitable hopper or other suitable means, such as is schematically represented in FIGURE 5.

*Embodiment of FIGURE 4*

FIGURE 4 shows a pair of plasma-jet torches 16 which may be identical to those described with reference to FIGURES 2 and 3. Torches 16 (one or more) are suitably mounted and are so directed that their plasma jets 17 converge against opposite sides of a vitreous rod 44 at the same region or area. The rod 44 is thus melted, and the molten material is blown into threads or filaments indicated at 46. The rod 44 is suitably driven and guided, such as by feed rolls 47 and a guide or bushing 48.

It is to be understood that the use of the term "rod" is not intended to denote that the element 44 must be relatively rigid and discontinuous. Instead, the rod 44 may be a long thread wound on a feed roll. Thus, the torches 16 convert the thread into fibers having much smaller diameters than that of the thread.

*Embodiment of FIGURES 5 and 6*

FIGURES 5 and 6 show an embodiment in which molten glass is fed through a torch 16a which is similar to the one described with reference to FIGURES 2 and 3. Except as will be specifically stated, the torch 16a is identical to the one 16 previously described, and the representation thereof has been provided with similar reference numerals. The body 37 and back electrode 22 of FIGURE 2 are combined into a single back electrode unit 49, and the water-cooling means for the back electrode are eliminated. An axial passage 51 is provided in electrode 49 and communicates with a central opening in the tungsten insert 26a. The diameter of nozzle opening 19a should be substantially increased in order to prevent or minimize the deposition of glass on the insert 21a.

Molten glass, or other vitreous material, is fed into the outer end of passage 51 from a suitable vat 52 having a bushing or nipple 53 disposed closely adjacent the outer end of electrode 49. It is to be understood that the bushing 53 may be suitably lined, and may be suitably heated such as by electric resistance heating, in order to maintain a suitable flow of glass at the desired temperature. The glass flow through passage 51 is maintained due to the fact that electrode unit 49 is heated by the electric arc, there being no water cooling illustrated. Alternatively, however, the unit 49 may be suitably water cooled, particularly at the insert 26a, and suitable means provided to maintain the walls of passage 51 sufficiently hot to insure flow of glass at the desired temperature. The glass fibers emanating from the torch 16a enter a hopper schematically represented at 54, from which they are conducted by means of a suitable conveyor belt 56.

To summarize the method of FIGURES 5 and 6, the molten glass from vat 52 is caused to flow through passage 51, from which it enters the base portion of the electric arc struck between inserts 26a and 21a. The whirling gas in chamber 27 constricts this arc and also constricts the glass flowing downwardly out of passage 51, so that the glass is maintained away from the inner wall of nozzle insert 21a. Because of the high velocity and temperature of the plasma jet flowing from electrode 49 and out nozzle opening 21a, the molten glass is converted into filaments or threads represented at 57.

Figure 7:
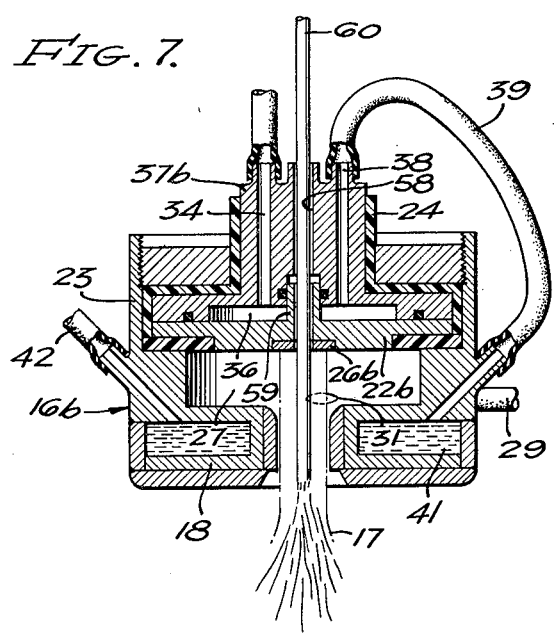
FIGURE 7 is a sectional view illustrating the feeding of a glass rod through a plasma-jet torch.

*Embodiment of FIGURE 7*

FIGURE 7 illustrates a plasma-jet torch 16b which is identical to the torch 16 described with relation to FIGURES 2 and 3, except that an axial passage 58 is provided in body 37b and back electrode 22b. The back electrode 22b is formed with a hollow stem 59 which enters a counterbore in body 37b, the result being that the passage 58 is continued through stem 59 and through the central portion of insert 26b. It is to be understood that the electrical conductor 33 (FIGURE 2) is connected to a portion of the body 37b other than the center or axis. Except as specifically stated, the torch 16b is identical to the one 16 previously described.

In the method of FIGURE 7, a rod 60 of glass or other vitreous substance is introduced through passage 58 and axially into the arc chamber 27. This rod is converted into viscous or melted condition by the heat, and fibers are drawn therefrom because of the high velocity of the plasma flowing through the nozzle opening.

Instead of introducing the vitreous substance in rod form as illustrated, it is within the scope of the invention to introduce the vitreous substance in powder form through the passage 58 (or other passage) into the plasma jet, so that the powder is converted to filaments by the heat and velocity of the jet. The powder may be introduced along with a suitable carrier, such as an inert gas carrier.

Figure 7A:
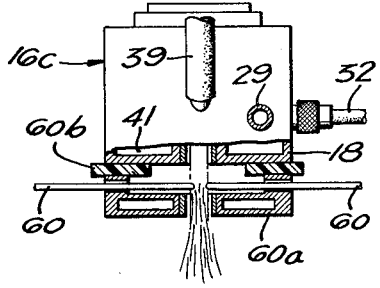
FIGURE 7A is a view, partly in elevation and partly in section, showing the feeding of vitreous substance into the jet in a chamber formed forwardly of the nozzle electrode.

*Embodiment of FIGURE 7A*

FIGURE 7A shows a plasma-jet torch 16c which is identical to the torch 16 described with reference to FIGURES 2 and 3. In this embodiment, an additional water-cooled disc 60a is mounted forwardly of the nozzle electrode 18, being separated therefrom by insulation 60b. Disc 60a has a central opening, protected by refractory metal, through which the plasma jet passes after emanating from the nozzle opening in electrode 18. Gas may be introduced into the space between disc 60a and nozzle 18, for cooling, protective, carrier or other purposes.

Glass is introduced through suitable openings into the plasma jet in the region between nozzle 18 and disc 60a, for example in the form of the rods 60. The glass may also be introduced in molten or powder form. One advantage of this embodiment is that the glass may enter the jet at right angles. Furthermore, the arrangement is unitary and highly efficient.

It is also within the scope of the invention to shoot two plasma jets out of an arc chamber in diametrically opposite directions through coaxial openings in the nozzle and back electrodes. Glass is then introduced into both jets, such as by feeding into the arc chamber, to provide very efficient fiber formation.

Figure 8:
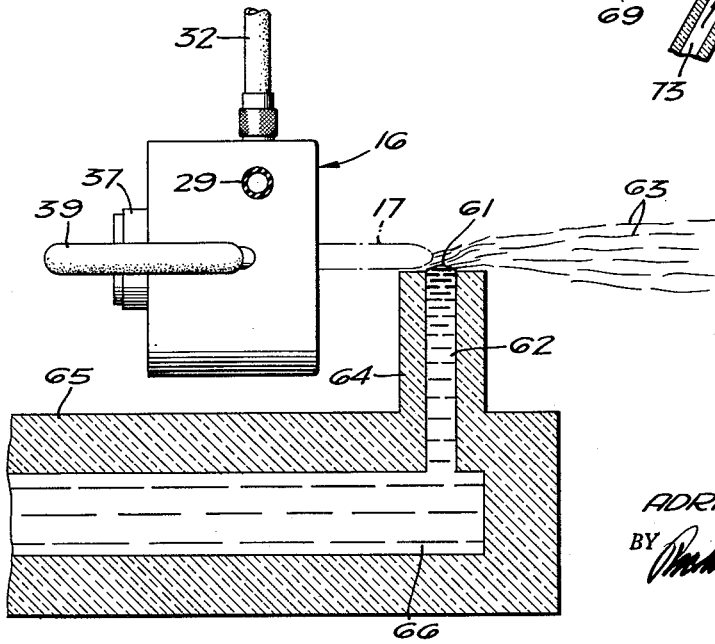
FIGURE 8 illustrates an embodiment in which a plasma-jet torch is employed to blow vitreous substance from the surface of a pool thereof.

Embodiment of FIGURE 8

In the embodiment of FIGURE 8, a plasma-jet torch 16 is employed and may be identical to the one described with reference to FIGURES 2 and 3. The plasma jet 17 emanating from the torch 16 is employed to blow the meniscus 61 off the upper end of an upwardly-flowing stream 62 of molten glass, so that threads or filaments 63 are formed. The stream 62 flows through a refractory tube 64 from a vat or furnace 65, it being understood that the level of the surface (not shown) of the molten glass 66 in the vat or furnace may be approximately the same as the elevation of the meniscus 61 so that a continuous flow is provided.

Figure 9:
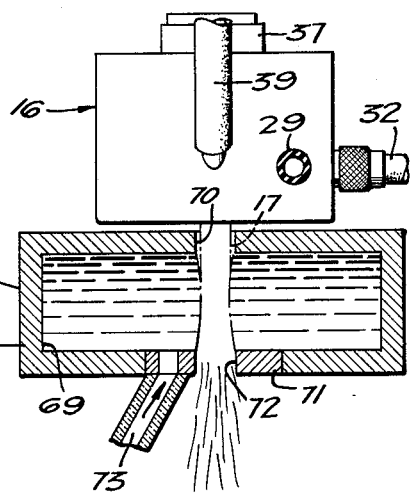
FIGURE 9 illustrates an embodiment in which a plasma jet is passed through the vortex in a pool of whirling vitreous material in liquid condition.

Embodiment of FIGURE 9

In this embodiment, the torch 16 of FIGURES 2 and 3 is again employed, and is mounted coaxially with a centrifugal vat 68 having an annular or cylindrical chamber 69. The upper disc-shaped wall of vat 68 is formed with a central opening 70 into which the plasma jet 17 is directed. The lower disc-shaped wall of the vat 68 has a central opening the wall of which is a cylindrical surface disposed radially outwardly from the lower end of jet 17. An insert disc 71 is suitably mounted in such opening, and has a central outlet 72 through which the jet 17 (and contained glass fibers) emanate. Disc 71 does not rotate with vat 68. Glass is fed, in molten or powder form, through a passage 73 leading to the stationary insert 71 and thus into the chamber 69.

The vat 69 is rotated at a substantial velocity, and coaxially with the jet 17, by a motor and drive means schematically represented at 74 and 75, respectively. The glass in vat 69 thus forms a vortex through which the jet 17 passes at high velocity. The jet draws a certain proportion of the glass with it in the form of the fibers or filaments indicated at the lower portion of FIGURE 9. The process may be a continuous one, with the rate of introduction of glass through passage 73 being the same as the rate of withdrawal of glass through opening 72 due to the action of plasma jet 17.

It is to be understood that suitable means may be provided to heat the glass in chamber 69, and suitable liner means, etc., may be employed in a manner known to the art. This applies also to the embodiment of FIGURE 8 and to all embodiments. The stationary insert 71 may be suitably mounted in any manner, and suitable sealing means may be provided to prevent leakage of glass between the outer cylindrical surface of stationary insert 71 and the adjacent inner cylindrical surface of the lower wall of rotating vat 68.

The present method is applicable to substantially any substance capable of being blown or drawn into relatively fine fibers at high temperatures. Thus, the terms "glass," "vitreous substance," etc., as employed in this specification and in the claim, are defined to include not only true glass but also quartz and a number of refractories such as zirconia and alumina. It is an important feature of the present method that a number of these refractory substances may be converted into fibers from which cloth and other products may be made.

The power input to the plasma-jet torch, the degree of arc constriction and other factors, are so regulated that the jet temperature is substantially higher than the melting point of the substance being converted into fibers. The jet is thus operated normally in the range of about 2,000 degrees C. to 5,000 degrees C., or even higher.

Various embodiments of the present invention, in addition to what has been illustrated and described in detail, may be employed without departing from the scope of the accompanying claim.

I claim:

A method of manufacturing small-diameter threads or fibers of vitreous material, which comprises providing a centrifugal vat having inlet and outlet openings in the axis thereof, rotating said vat about said axis, introducing vitreous material into said vat and maintaining the vitreous material in said vat in molten condition whereby a vortex is formed therein along the axis between said inlet and outlet openings, and passing a jet of high-temperature high-velocity electrical plasma axially into said inlet opening and through said vortex in said molten material to thereby cause flow of fibers or filaments out said outlet opening.

References Cited in the file of this patent

UNITED STATES PATENTS

| | | |
|---|---|---|
| 1,133,508 | Schoop | Mar. 30, 1915 |
| 2,338,473 | Von Pazsiczky | Jan. 4, 1944 |
| 2,489,242 | Slayter et al. | Nov. 22, 1949 |
| 2,616,843 | Sheer et al. | Nov. 4, 1952 |
| 2,768,279 | Rava | Oct. 23, 1956 |
| 2,770,708 | Briggs | Nov. 13, 1956 |
| 2,795,819 | Lezberg et al. | June 18, 1957 |
| 2,806,124 | Gage | Sept. 10, 1957 |
| 2,859,560 | Wald et al. | Nov. 11, 1958 |
| 2,925,620 | Karlovitz et al. | Feb. 23, 1960 |
| 3,015,127 | Stalego | Jan. 2, 1962 |